United States Patent [19]

Biass

[11] Patent Number: 4,643,609
[45] Date of Patent: Feb. 17, 1987

[54] GRIPPING ASSEMBLY FOR ELONGATED OBJECTS SUCH AS CABLES OR BARS

[75] Inventor: David Biass, Geneva, Switzerland

[73] Assignee: Cibeles International Inc., Panama

[21] Appl. No.: 820,190

[22] Filed: Jan. 17, 1986

[51] Int. Cl.$^4$ .............................................. F16B 2/00
[52] U.S. Cl. .................................. 403/369; 403/368; 403/314; 24/122.3
[58] Field of Search ............... 403/368, 369, 366, 371, 403/372, 374, 312, 314; 24/114.5, 115 M, 136 R, 122.3; 294/102.2

[56] References Cited

U.S. PATENT DOCUMENTS

| | | | |
|---|---|---|---|
| 749,896 | 1/1904 | Brown | 24/136 R |
| 1,562,568 | 11/1925 | Linquist | 24/136 R |
| 1,637,270 | 7/1927 | Neely | 294/102.2 |
| 1,708,979 | 4/1929 | Usher | 403/369 |
| 1,854,140 | 4/1932 | Hopkins | 24/136 R |
| 4,381,584 | 5/1983 | Coyle, Sr. | 166/97.5 X |
| 4,407,471 | 10/1983 | Wilmsmann et al. | 24/136 R |

FOREIGN PATENT DOCUMENTS 160013  3/1921  United Kingdom ................ 403/369

*Primary Examiner*—Richard J. Scanlan, Jr.
*Assistant Examiner*—Joseph A. Fischetti

[57] ABSTRACT

A reversible wedge gripping assembly is provided for elongated objects, such as cables or bars, comprising an elongated casing which is open at both ends and which defines a passage adapted for receiving said elongated object, and a first pair of wedge-shaped clamping jaws, which are mounted in the passage of the casing for gripping said elongated object. Each of the two clamping jaws has, in its inner surface a longitudinal groove having two flat side walls which converge towards the bottom of the groove and each of which makes a predetermined angle with the plane in which the two clamping jaws move. A second pair of clamping jaws is disposed in the longitudinal grooves of the first pair of clamping jaws, each of the clamping jaws of the second pair comprising an outer surface which, in cross section, has a V section and which is in contact with one of the two side walls of the groove of one of the two clamping jaws of the first pair and with one of the two side walls of the groove of the other clamping jaws of the first pair.

10 Claims, 7 Drawing Figures

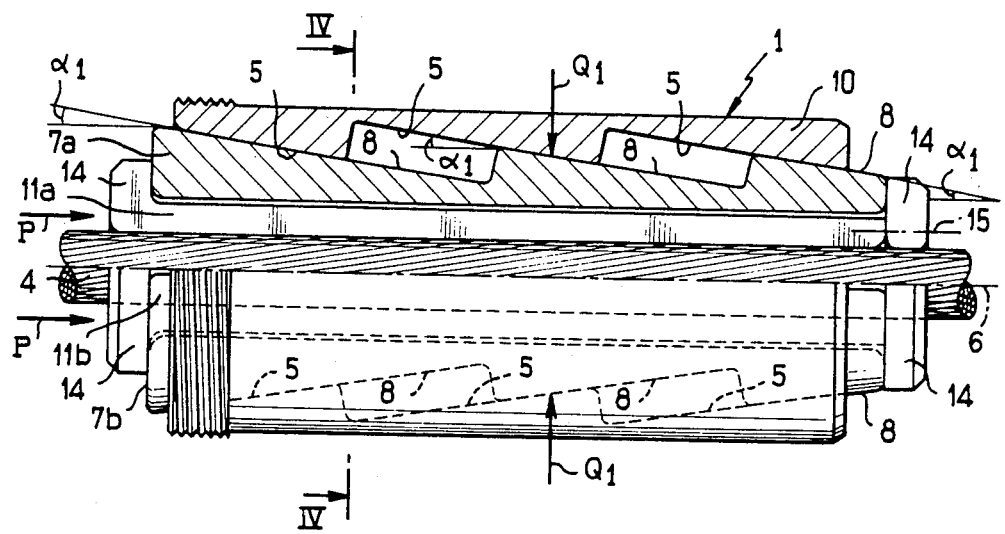
FIG_3
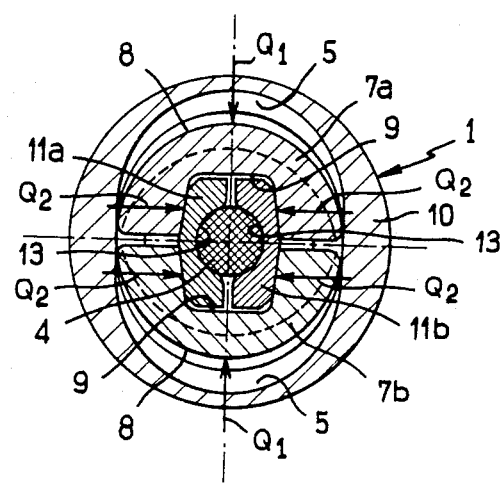
FIG_4

GRIPPING ASSEMBLY FOR ELONGATED OBJECTS SUCH AS CABLES OR BARS

BACKGROUND OF THE INVENTION

1. Field of the Invention

The present invention relates to a gripping assembly having reversible wedges, i.e. wedges having a self-unlocking ability, for gripping elongated objects such as cables or bars. More particularly, the invention relates to a gripping assembly comprising an elongated casing which is open at both ends and which defines a passage adapted for receiving said elongated object, and a pair of wedge-shaped clamping jaws, which are mounted in the passage of the casing for gripping said elongated object, said passage comprising two inner surfaces, which are disposed respectively on each side of the longitudinal axis of said passage and which converge towards one end thereof while making a predetermined angle with said longitudinal axis, each of said clamping jaws comprising an outer surface, which is in contact with one of the two inner surfaces of the passage of the casing, and an inner surface which faces said elongated object and in which a longitudinal groove is formed, the two clamping jaws being movable in a plane containing the longitudinal axis of the passage of the casing.

Reversible wedge gripping assemblies to which the present invention relates are used in numerous devices or apparatus, such as, for example, motor devices operating step by step, linear hydraulic winches, devices for anchoring cables or bars and certain handling devices. Generally, the reversible wedge gripping assemblies are used when it is desired to grip at least momentarily an object of elongated shape, for example for exerting a traction force on said object, and when the clamping jaws of the gripping assembly must be capable then of releasing the gripping pressure which they exert on said object, without disassembling the gripping assembly, by a simple relative movement in a direction opposite the pulling direction or by the action of a control device.

2. Description of the Prior Art

Numerous gripping assemblies have been proposed. They may be classified into two categories, namely gripping assemblies the clamping jaws of which have a slanting flat or conical outer surface, which is directly in contact with the inner flat or conical surface, slanted correspondingly, of the casing of the gripping assembly (see for example U.S. Pat. Nos. 1,637,270, 2,146,575, 2,958,916, 3,758,922 and 4,381,584, the patent DE No. 405 524 and the patent GB No. 13 230), and the gripping assemblies in which rollers or balls are interposed between the outer surface of the clamping jaws and the inner surface of the casing of the gripping assembly (see for example the U.S. Pat. Nos. 1,146,801 and 2,400,514 and the patent EP No. 0057622).

According to the general theory of wedges set forth more particularly in the publication "Techniques de l'Ingénieur", Mécanique et Chaleur, vol. 3, pages B 602-1 to 602-3, the driving-in force P, parallel to the axis of the wedge (clamping jaw) and the force Q normal to said axis, applied to the wedge, are related by the following relationship in the case of wedges with flat slanted surfaces:

$$Q = \frac{P}{2 \tan(\alpha + \phi)} \quad (1)$$

in which $\alpha$ is the angle between the axis and a slanged face of the wedge (the axis being the straight line passing through the tip of the wedge and perpendicular to the base thereof), and $\phi$ is an angle such that $\tan \phi = f$, f being the coefficient of friction of the faces of the wedge (the outer face of a clamping jaw and the inner face of the casing of the gripping assembly) which are mutually in contact. In the case of wedges with conical surface, the formula (1) becomes:

$$Q = \frac{P}{\pi \tan(\alpha + \phi)} \quad (2)$$

$\alpha$ being in this case the angle between the axis and a generating line of the conical surface of the wedge.

In both cases, the condition of reversibility of the wedge is $\alpha > \phi$.

When the object to be gripped is a cable or a bar with substantially round cross section, the inner surface of the clamping jaws of the gripping assembly, i.e. the surface of the clamping jaws which is in contact with the object to be gripped, usually comprises a groove with semi-circular cross section, the radius of which corresponds to the radius of the cross section of the cable or the bar to be gripped. In this case, assuming that the pressure due to gripping is transmitted hydrostatically to the inside of the cable, the force of adhesion or friction force F between each clamping jaw of the gripping assembly and the cable is given by the formula:

$$F = \pi \cdot Q \cdot f' \quad (3)$$

in which Q has the meaning already given and f' represents the coefficient of friction between the clamping jaw and the cable. Replacing Q by its value, given by formula (1) or by formula (2) we obtain:

$$F = \frac{\pi \cdot P \cdot f'}{2 \tan(\alpha + \phi)} \quad (4)$$

or $$F = \frac{P \cdot f'}{\tan(\alpha + \phi)} \quad (5)$$

Formulas (4) and (5) may further be written:

$$F = kP \quad (6)$$

with:

$$k = \frac{\pi \cdot f'}{2 \tan(\alpha + \phi)} \quad (7)$$

in the case of clamping jaws with flat outer surface, and:

$$k = \frac{f'}{\tan(\alpha + \phi)} \quad (8)$$

in the case of clamping jaws with conical outer surface.

So that there is no sliding between each clamping jaw and the cable to be gripped, the absolute value of the friction force F must be higher than or equal to the absolute value of the driving-in force P (these two forces are oriented in opposite directions). In other words, k must be greater than or equal to 1. To this end, according to formulas (7) and (8), it can be seen that f' must be as large as possible and/or that $(\alpha+\phi)$ must be the smallest possible.

For example, with a steel cable and steel clamping jaws having a groove with a smooth surface, f' is equal to 0.1. For steel clamping jaws, the outer surface of which is directly in contact with the inner surface of the casing of the gripping assembly, the angle $\phi$ is about equal to 6°. Taking into account the condition of reversibility ($\alpha > \phi$) the angle $\alpha$ is chosen for example equal to 8°30'. Thus, according to formulas (7) and (8), k is equal to 0.61 or 0.39 depending on whether the clamping jaws have a flat or conical outer surface. In both cases, it can be seen that the friction force F is smaller than the driving-in force P and therefore sliding occurs between the clamping jaws and the cable.

To avoid any sliding between the clamping jaws and the cable, a first known solution consists in greatly increasing the coefficient of friction f' by scoring or notching the surface of the groove of the clamping jaws which is in contact with the cable (see for example the U.S. Pat. Nos. 1,637,270, 2,146,575, 2,958,916, 3,758,922 and 4,381,584). However, the drawback of scores or notches is that they damage the outer surface of the cable, in particular when a high gripping pressure must be applied to the cable, for example for exerting a heavy traction force thereon.

Another known solution consists in considerably reducing, even cancelling out the value of the angle $\phi$, i.e. in considerably reducing or suppressing the friction between the outer surface of the clamping jaws and the inner surface of the casing of the gripping assembly by interposing rollers or balls between these surfaces, as shown for example in the U.S. Pat. Nos. 1,146,801 and 2,400,514 or in the patent EP No. 0057622. This further allows to reduce the value of the angle $\phi$ while still satisfying the condition of reversibility. For example, with rollers ($\phi \cong 0$) and with clamping jaws having a slope of 0.1 ($\alpha = 5°42'$), and with a coefficient of friction f'=0.1, according to formula (7) k is equal to 1.57. In this case, the friction force F between the cable and the clamping jaws is much greater than the driving-in force P and no sliding occurs between the clamping jaws and the cable. However, for equal gripping forces and equal traction forces, the gripping assemblies with rollers or balls have the drawback of being of a size, weight and cost higher than the gripping assemblies in which the clamping jaws are directly in contact with the inner surface of the casing of the gripping assembly. Furthermore, since the contact pressures between the rollers, on the one hand, and the outer surface of the clamping jaws and the inner surface of the casing of the gripping assembly on the other hand, are locally greater than in the case where the outer surface of the clamping jaws is directly in contact with the inner surface of the casing, the clamping jaws and the casing must be made from very hard steels or their surfaces in contact with the rollers must be treated, for example by a heat treatment, so as to make them hard and capable of withstanding the locally higher contact pressures, which further increases the cost of gripping assemblies having rollers.

SUMMARY OF THE INVENTION

The object of the present invention is therefore to provide a reversible wedge gripping assembly, without any rollers or balls, in which the clamping jaws have a smooth contact surface for engaging the cable or other elongated object to be gripped, so without any risk of damaging the cable or said elongated object, and nevertheless without sliding occuring between said clamping jaws and said cable or said elongated object.

Another object of the present invention is also to provide a reversible wedge gripping assembly, the size, weight and cost of which are lower than those of a gripping assembly with rollers or balls.

To this end, the gripping assembly of the present invention is characterized in that the longitudinal groove of each of the clamping jaws comprises two flat side walls which converge towards the bottom of the groove and each of which makes a predetermined angle with the plane in which the two clamping jaws move, and in that it further comprises a second pair of clamping jaws, which are disposed in the longitudinal grooves of the first pair of clamping jaws, each of the jaws of the second pair having an outer surface which, in cross section, has a flattened V shape and which is in contact with one of the two sidewalls of the groove of one of the two clamping jaws of the first pair and with one of the two sidewalls of the groove of the other clamping jaw of the first pair, and an inner surface which faces said elongated object, the two clamping jaws of the second pair being movable perpendicularly to the longitudinal axis of the passage of the casing in a second plane perpendicular to the first above-mentioned plane, i.e. the plane in which the clamping jaws of the first pair move, and coupling means cooperating with the clamping jaws of the first and second pairs for preventing any relative axial movement between said first and second pairs of clamping jaws, while allowing relative transverse movements between said first and second pairs of clamping jaws.

BRIEF DESCRIPTION OF THE DRAWINGS

The invention will be better understood from the following description of different embodiments of the gripping assembly, with reference to the accompanying drawings in which:

FIG. 3 shows, half in side elevation and half in longitudinal section, a second embodiment of the gripping assembly, FIG. 4 is a section view through line IV—IV of FIG. 3.

DESCRIPTION OF THE PREFERRED EMBODIMENTS

Figure 1:
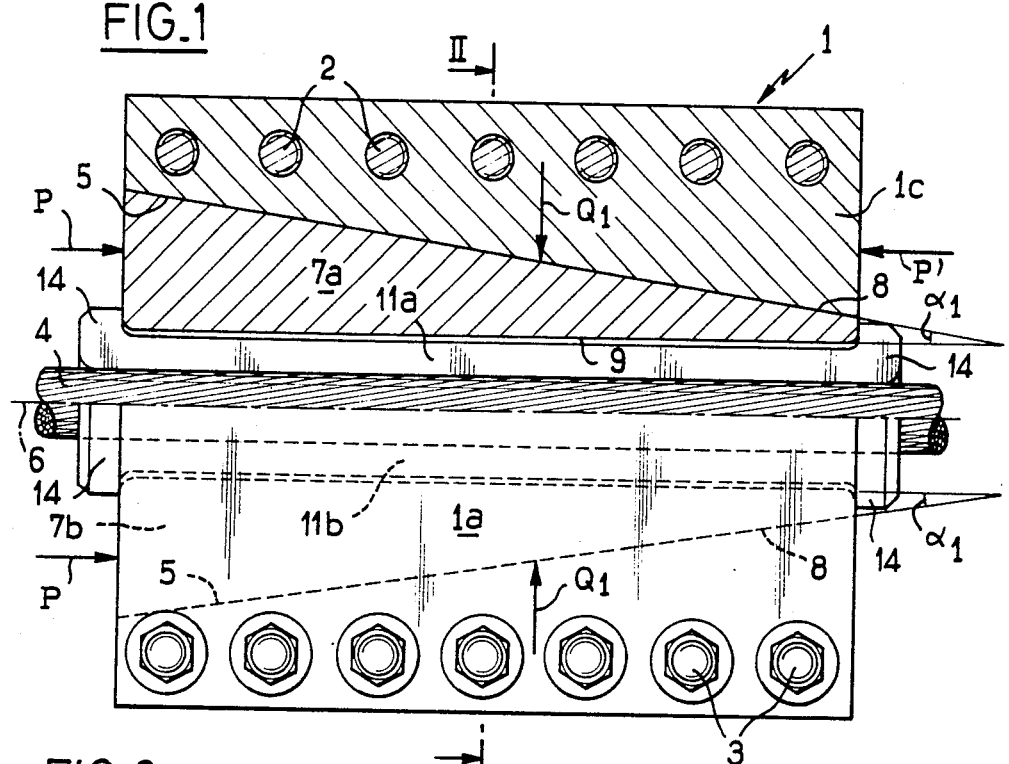
FIG. 1 shows, half in side elevation and half in longitudinal section, a first embodiment of the gripping assembly.
Figure 2:
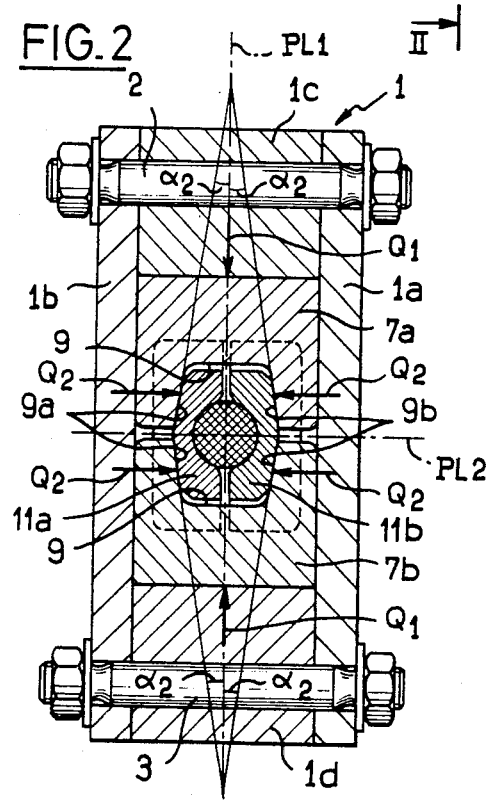
FIG. 2 is a section view through line II—II of FIG. 1.

The gripping assembly shown in FIGS. 1 and 2 comprises a casing 1, of a generally parallelepipedic shape, comprising conventionally two flat rectangular plates 1a and 1b and two bearing blocks 1c and 1d which are disposed between the two plates 1a and 1b and assembled therewith by two sets of stud bolts 2 and 3, respectively. The two plates 1a and 1b and the two bearing blocks 1c and 1d define therebetween a passage for an elongated object to be gripped, for example a cable 4.

Each of the two bearing blocks 1c and 1d has a flat inner surface 5 which forms an angle $\alpha_1$ with the longitudinal axis 6 of the passage of the casing, the two surfaces 5 converging towards one end of said passage.

A first pair of clamping jaws 7a and 7b is disposed in the above-mentioned passage, respectively on each side of cable 4. Each of the two clamping jaws 7a and 7b has a flat outer surface 8 which is slanted by an angle $\alpha_1$ with respect to the axis 6 and which is in sliding contact with the inner surface 5 of one of the two bearing blocks 1c and 1d. Thus, any relative longitudinal movement between each of the two jaws 7a and 7b and the adjacent bearing block 1c or 1d, respectively, causes a movement of the clamping jaws 7a and 7b perpendicularly to the axis 6 in plane $PL_1$ (FIG. 2).

In its inner surface, i.e. the one which faces the cable 4, each of the two clamping jaws 7a and 7b has a longitudinal groove 9 which extends parallel to the axis 6. As can be seen more particularly in FIG. 2, each groove 9 has two flat sidewalls 9a and 9b which converge towards the bottom of the groove 9 while each forming an angle $\alpha_2$ with the plane $PL_1$. Inside the two grooves 9 is disposed a second pair of clamping jaws 11a and 11b (see also FIG. 2a). Each of the two jaws 11a and 11b has an outer surface 12 which, in cross section, has a flattened V shape. More precisely, each of the two legs of the V makes an angle $\alpha_2$ with the plane $PL_1$. The outer surface 12 of jaw 11a is in sliding contact with the sidewalls 9a of grooves 9 of the two jaws 7a and 7b, whereas the outer surface 12 of jaw 11b is in sliding contact with the sidewalls 9b of the grooves of the two jaws 7a and 7b. Each of the two jaws 11a and 11b has, in its inner surface, i.e. the one which faces the cable 4, a longitudinal groove 13 having a smooth surface and a semi-circular cross section, which receives a part of cable 4. Thus, any movement of jaws 7a and 7b perpendicularly to the axis 6 in plane $PL_1$ causes a movement of jaws 11a and 11b perpendicularly to the axis 6 in the plane $PL_2$ which is perpendicular to $PL_1$. More precisely, the two jaws 11a and 11b grip the cable 4 when the two jaws 7a and 7b are moved towards the axis 6 in plane $PL_1$, whereas they release the cable 4 when the two jaws 7a and 7b are moved away from the axis 6 in plane $PL_1$.

Figure 2A:
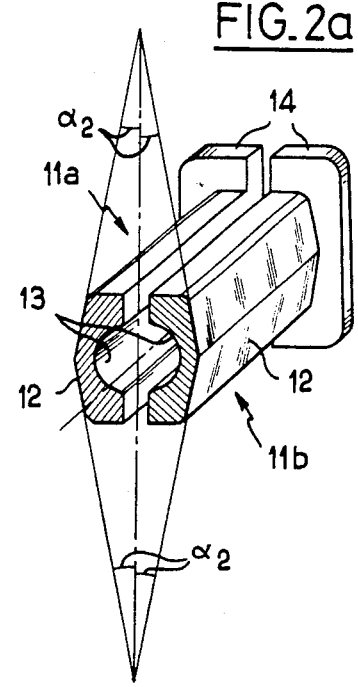
FIG. 2a is a perspective view showing a part of two clamping jaws used in the gripping assembly of FIGS. 1 and 2.

As can be seen more particularly in FIGS. 1 and 2a, each of the two jaws 11a and 11b comprises, at each of its ends, a portion 14 which projects laterally outwardly and which is in sliding contact with the end faces of the two jaws 7a and 7b at one end thereof. Thus, jaws 7a and 7b are held axially between the four projecting portions 14 of jaws 11a and 11b, so that any axial movement transmitted by friction by cable 4 to jaws 11a and 11b is also transmitted to the two jaws 7a and 7b. Nevertheless, the two jaws 7a and 7b remain free to move transversely with respect to the two jaws 11a and 11b for clamping and unclamping the cable 4.

As shown in FIGS. 1 and 2a, the projecting portions 14 of the two jaws 11a and 11b form an integral part of said jaws, but they could be formed by pieces removably fixed to the ends of jaws 11a and 11b. Alternatively, instead of being fixed to the ends of jaws 11a and 11b, the projecting portions 14 could be fixed to the ends of jaws 7a and 7b and be in sliding contact with the end faces of jaws 11a and 11b. In yet another embodiment, the grooves 9 of the two jaws 7a and 7b could be closed at both ends thereof, jaws 11a and 11b being retained axially inside the grooves 9 by the closed ends thereof.

With the gripping assembly which has just been described above, it is possible to grip the cable 4 without damaging it (the grooves 13 have a smooth surface) and without any risk of sliding between cable 4 and jaws 11a and 11b, as will now be seen. In fact, when each of the two jaws 7a and 7b is subjected to a driving-in force P (FIG. 1) or, which amounts to the same thing, when casing 1 is subjected to a thrust P' opposite the driving-in force P, each of the two jaws 7a and 7b is subjected to a force $Q_1$, which is normal to the axis 6 and which, according to formula (1) is equal to:

$$Q_1 = \frac{P}{2 \tan (\alpha_1 + \phi_1)} \quad (9)$$

in which $\alpha_1$ has the meaning given above and $\tan \phi_1$ is the coefficient of friction between jaws 7a and 7b and casing 1. Under the effect of the force $Q_1$, each of the two jaws 7a and 7b applies to each of the two jaws 11a and 11b a force $Q_2$ which is normal to the force $Q_1$ and to the axis 6 and which, according to formula (1) is equal to:

$$Q_2 = \frac{Q_1}{2 \tan (\alpha_2 + \phi_2)} \quad (10)$$

in which $\alpha_2$ has the meaning given above and $\tan \phi_2$ is the coefficient of friction between jaws 11a and 11b and jaws 7a and 7b. Thus, each of the two jaws 11a and 11b are subjected to a force which is normal to axis 6 and which is equal to $2Q_2$. Replacing Q by $2Q_2$ in formula (3), the friction force F between each of the two jaws 11a and 11b and the cable 4 is therefore equal to:

$$F = \pi \cdot 2Q_2 \cdot f' \quad (11)$$

in which f' is the coefficient of friction between jaws 11a and 11b and cable 4. Taking into account formulas (9) and (10), formula (11) becomes:

$$f = \frac{\pi \cdot P \cdot f'}{2 \tan (\alpha_1 + \phi_1) \cdot \tan (\alpha_2 + \phi_2)} \quad (12)$$

With $f' = 0.1$, $\alpha_1 = \alpha_2 = 8°30'$ and $\phi_1 = \phi_2 = 6°$ we obtain:

$$F \approx 2.35 P \quad (13)$$

From the foregoing, it is clear that with the gripping assembly shown in FIGS. 1 and 2, the friction force F between each of the two jaws 11a and 11b is greater than the driving-in force P, and that consequently no sliding can occur between cable 4 and jaws 11a and 11b.

In the embodiment shown in FIGS. 3 and 4, the elements of the gripping assembly which are identical or which have the same function as those of the gripping assembly shown in FIGS. 1 and 2 are designated by the same reference numbers. The gripping assembly shown in FIGS. 3 and 4 differs essentially from the gripping assembly shown in FIGS. 1 and 2 in that the casing 1 is no longer formed from several assembled parts, but in a single piece cut out from a cylinder block 10. Furthermore, the inner surfaces 5 of casing 1 and the outer surfaces 8 of the two jaws 7a and 7b are no longer flat, but semi-cylindrical, the axes of the semi-cylindrical surfaces forming the angle $\alpha_1$ with the axis 6. In addition, in order to reduce the outer diameter of the cylindrical casing 1, the inner surfaces 5 of said casing and the outer surfaces 8 of the two jaws 7a and 7b are preferably stepped, as shown in FIG. 3.

Instead of being semicylindrical, the inner surfaces 5 of casing 1 and the outer surfaces 8 of the two jaws 7a and 7b could be conical. However, semicylindrical surfaces are preferable to conical surfaces, for semicylindrical surfaces always give a surface to surface contact whatever the degree of driving-in of jaws 7a and 7b into casing 1, whereas conical surfaces, for each of the two jaws 7a and 7b, would give successively a linear contact along a generating line of the conical surfaces, a surface to surface contact and a linear contact along the two generating lines of the conical surfaces as the jaws 7a and 7b are progressively driven into the casing 1.

The remaining elements of the gripping assembly of FIGS. 3 and 4 are identical to those of the gripping assembly shows in FIGS. 1 and 2. In particular, the two jaws 11a and 11b are identical to those of the gripping assembly of FIGS. 1 and 2. However, in the case of the gripping assembly shown in FIGS. 3 and 4, since the casing 1 is made as a single piece and therefore cannot be disassembled, at least the two projecting portions 14 at one of the ends of the two jaws 11a and 11b must be detachably fixed to the corresponding jaws 11a and 11b, for example by screws, as shown schematically at 15 by a dash dot line, so that jaws 11a and 11b and jaws 7a and 7b can be set into the casing 1 and removed therefrom.

As can be seen by comparing FIGS. 3 and 4, on the one hand, with FIGS. 1 and 2, on the other hand, the gripping assembly of FIGS. 3 and 4 is much more compact than the gripping assembly of FIGS. 1 and 2. Furthermore, like the gripping assembly of FIGS. 1 and 2, the gripping assembly of FIGS. 3 and 4 allows the cable 4 to be gripped without damaging it and without any risk of sliding between the jaws 11a and 11b and cable 4. In fact, as in the preceding embodiment, under the effect of the driving-in force P, each of the two jaws 7a and 7b is subjected to a force $Q_1$, and under the effect of the two forces $Q_1$, each of the two jaws 11a and 11b is subjected to a force equal to 2 $Q_2$. Formula (2), which is valid for wedges with conical surface, is still valid in the case of wedges with slanted semi-cylindrical surfaces. In this case, the value of the force $Q_1$ is given by the following formula:

$$Q_1 = \frac{P}{\pi \tan(\alpha_1 + \phi_1)} \quad (14)$$

In the gripping assembly of FIGS. 3 and 4, the value of $Q_2$ is again given by the formula (10), and the value of the friction force F between each of the two jaws 11a and 11b and cable 4 is again given by formula (11). Therefore, taking into account the formulas (10) and (14), formula (11) may further be written:

$$F = \frac{f' \cdot P}{\tan(\alpha_1 + \phi_1) \cdot \tan(\alpha_2 + \phi_2)} \quad (15)$$

Assuming that $f'=0.1$; $\alpha_1=13°$; $\alpha_2=8°30'$ and $\phi_1=\phi_2=6°$, we obtain:

$$F \simeq 1.1 \cdot P \quad (16)$$

According to formula (16), it can be seen that again in this case, the friction force F is greater than the driving-in force P and that, consequently, no sliding can occur between each of the two jaws 11a and 11b and cable 4.

Figure 5:
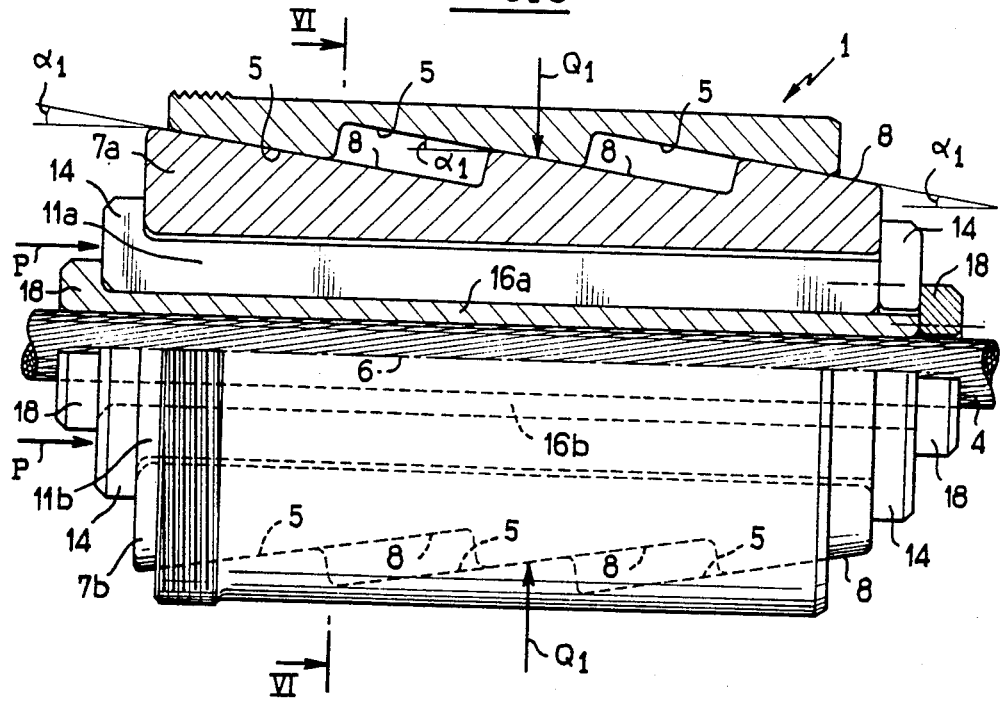
FIG. 5 shows, half in side elevation and half in longitudinal section, a third embodiment of the gripping assembly.
Figure 6:
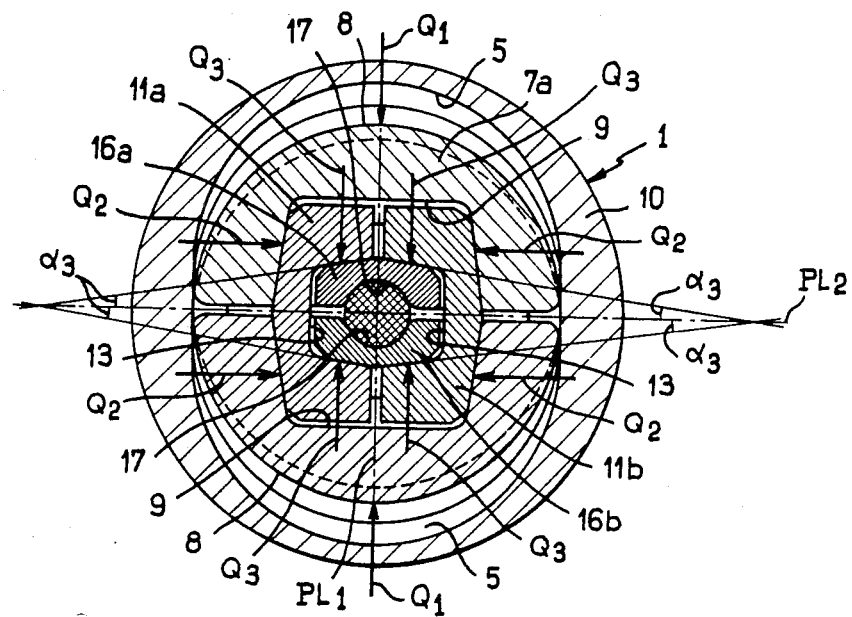
FIG. 6 is a section view through line VI—VI of FIG. 5.

In the embodiment shown in FIGS. 5 and 6, the elements of the gripping assembly which are identical or which have the same function as those of the gripping assembly of FIGS. 3 and 4 are designated by the same reference numbers and will therefore not be again described in detail here. The gripping assembly of FIGS. 5 and 6 differs from that of FIGS. 3 and 4 in that the cross section of the longitudinal grooves 13 of jaws 11a and 11b is no longer semicircular but has a shape similar to that of the grooves 9 of the two jaws 7a and 7b, the two side walls of each groove 13 being flat and converging towards the bottom of the groove while each forming an angle $\alpha_3$ with the plane $PL_2$, in which the two jaws 11a and 11b move. Furthermore, these two jaws are not directly in contact with the cable 4, but a third pair of clamping jaws 16a and 16b is disposed in the grooves 13 of the two clamping jaws 11a and 11b between them and cable 4. The two jaws 16a and 16b have a shape similar to that of jaws 11a and 11b. The outer surface, in the form of a roof or flattened V, of each of the two jaws 16a and 16b is in sliding contact with one of the two side walls of the groove 13 of jaw 11a and with one of the two side walls of the groove 13 of jaw 11b. Each of the two jaws 16a and 16b has, in its inner surface facing cable 4, a longitudinal groove 17 having a semicircular cross section which receives a part of cable 4. Like jaws 7a and 7b, jaws 16a and 16b are movable in plane $PL_1$ perpendicularly to axis 6.

Like the jaws 11a and 11b, each of the two jaws 16a and 16b comprises, at each of its ends, a portion 18 which projects laterally outwardly and which is in sliding contact with the end faces of the two jaw 11a and 11b or with their portions 14. Thus, jaws 11a and 11b are retained axially between the projecting portions 18 of the two jaws 16a and 16b, but they may move transversely with respect to these latter jaws. Furthermore, so that the clamping jaws may be mounted inside casing 1, the two projection portions 18 at one of the ends of jaws 16a and 16b are detachably fixed to the corresponding jaws.

As in the gripping assembly of FIGS. 3 and 4, under the effect of a driving-in force P, each of the two jaws 7a and 7b of the gripping assembly of FIGS. 5 and 6 is subject to a force $Q_1$ which is perpendicular to the axis 6 and the value of which is given by the above mentioned formula (14). Similarly, under the effect of the two forces $Q_1$, each of the two jaws 11a and 11b is subjected to a force which is perpendicular to axis 6 and to forces $Q_1$ and which is equal to 2 $Q_2$, the value of $Q_2$ being given by formula (10). Furthermore, under the effect of force 2 $Q_2$, each of the two jaws 11a and 11b applies to each of the two jaws 16a and 16b a force $Q_3$ which is parallel to force $Q_1$ and the value of which is given by the following formula:

$$Q_3 = \frac{2 Q_2}{2 \tan(\alpha_3 + \phi_3)} \quad (17)$$

in which $\alpha_3$ has the meaning given above and $\phi_3$ is such that $\tan \phi_3$ is the coefficient of friction between jaws 16a and 16b *and jaws 11a* and 11b. Thus, each of the two jaws 16a and 16b is subjected to a force equal to 2 $Q_3$ and the value of the friction force F between each of the two jaws 16a and 16b and cable 4 is then given by the formula:

$$F = \pi \cdot 2 Q_3 \cdot f \quad (18)$$

in which f' is the coefficient of friction between jaws 16a and 16b and cable 4. Taking into account formulas (10), (14) and (17), formula (18) may further be written:

$$F = \frac{f' \cdot P}{\tan(\alpha_1 + \phi_1) \cdot \tan(\alpha_2 + \phi_2) \cdot \tan(\alpha_3 + \phi_3)} \quad (19)$$

With $f'=0$; $\alpha_1=13°$; $\alpha_2=\alpha_3=8°30'$, and $\phi_1=\phi_2=\phi_3=6°$, we obtain:

$$F \simeq 4.3 \cdot P \quad (20)$$

It can be seen that, again in this case, a friction force F is obtained which is appreciably greater than the driving-in force P and that, consequently, there is no risk of sliding between jaws 16a and 16b and cable 4. It can also be seen that it becomes possible to grip, without any sliding and with clamping jaws with smooth internal surfaces, cables or other elongated objects having a coefficient of friction appreciably lower than 0.1. For example, with the gripping assembly of FIGS. 5 and 6 and with the angle values given above, with a coefficient of friction f' equal to 0.025, a friction force F equal to 1.1 P would still be obtained.

It goes without saying that the embodiments of the present invention which have been described above have been given purely by way of indication and are in no wise limitative and that numerous modifications may be readily made by a man skilled in the art, without departing from the scope and spirit of the invention. Thus, more particularly, although in the Figures given above, the angles $\alpha_1$ and $\alpha_2$ (FIGS. 1 and 2) and angles $\alpha_2$ and $\alpha_3$ (FIGS. 5 and 6) had the same value, as well as the angles $\phi_1$, $\phi_2$ and $\phi_3$, these angles could have different values, provided that $\alpha_1$, $\alpha_2$ and $\alpha_3$ are larger than $\phi_1$, $\phi_2$ and $\phi_3$, respectively. Furthermore, although in the gripping assembly of FIGS. 5 and 6 the inner surfaces 5 of casing 1 and the outer surfaces 8 of jaws 7a and 7b are semicylindrical, they could be flat and slanted as in the gripping assembly of FIGS. 1 and 2.

What is claimed is:

1. A reversible wedge gripping assembly gripping an elongated object, such as a cable or a bar, comprising an elongated casing which is open at both ends and which defines a passage receiving said elongated object, said passage comprising two inner surfaces which are disposed respectively on each side of the longitudinal axis of said passage and which converge towards one end thereof while making a predetermined angle with said longitudinal axis, a first pair of wedge-shaped clamping jaws, which are mounted in the passage of the casing and which are movable in a first plane which contains the longitudinal axis of the passage of the casing, each of said clamping jaws comprising an outer surface which is in contact with one of the two inner surfaces of the passage of the casing, and an inner surface which faces said elongated object and in which a longitudinal groove is formed, the longitudinal groove of each of the two clamping jaws comprising two flat side walls which converge towards the bottom of the groove and each of which makes a predetermined angle with said first plane, a second pair of clamping jaws which are disposed in the longitudinal grooves of the first pair of clamping jaws, each of the clamping jaws of the second pair having an outer surface which, in cross section, has a V shape and which is in contact with one of the two side walls of the groove of one of the two clamping jaws of the first pair and with one of the two side walls of the groove of the other clamping jaw of the first pair, and an inner surface which faces said elongated object, the two clamping jaws of the second pair being movable perpendicularly to the longitudinal axis of the passage of the casing in a second plane perpendicular to said first plane, and coupling means cooperating with the clamping jaws of the first and second pairs for preventing any relative axial movement between said first and second pairs of clamping jaws, while permitting relative transverse movements between said first and second pairs of clamping jaws.

2. The gripping assembly as claimed in claim 1, wherein each of the two clamping jaws of the second pair comprises, at each of its ends, a portion which projects laterally outwardly and which is in sliding contact with the end faces of the two clamping jaws of the first pair, said projecting portions forming said coupling means.

3. The gripping assembly as claimed in claim 1, wherein the two inner surfaces of the passage of the casing and the outer surfaces of the clamping jaws of the first pair are flat and perpendicular to the first plane.

4. The gripping assembly as claimed in claim 1, wherein the two inner surfaces of the passage of the casing and the outer surfaces of the clamping jaws of the first pair are semicylindrical, the axes of the semicylindrical surfaces making said predetermined angle with the longitudinal axis of said passage.

5. The gripping assembly as claimed in claim 4, wherein the inner surfaces of the passage of the casing and the outer surfaces of the clamping jaws of the first pair are stepped.

6. The gripping assembly as claimed in claim 4, wherein the casing has a cylindrical external surface.

7. The gripping assembly as claimed in claim 1, wherein each of the two clamping jaws of the second pair has, in its inner surface, a longitudinal groove having a semicircular cross section, which reveives a part of the elongated object to be gripped.

8. The gripping assembly as claimed in claim 1, wherein each of the two clamping jaws of the second pair has, in its inner surface, a longitudinal groove having two flat side walls which converge towards the bottom of the groove and each of which makes a predetermined angle with said second plane, and further comprising a third pair of clamping jaws which are disposed in the longitudinal grooves of the second pair of clamping jaws, each of the clamping jaws of the third pair having an outer surface which, in cross section, has a V shape and which is in contact with one of the two side walls of the groove of one of the two clamping jaws of the second pair and with one of the two side walls of the groove of the other clamping jaw of the second pair, and an inner surface which faces said elongated object, the two clamping jaws of the third pair being movable perpendicularly to the longitudinal axis of the passage of the casing in said first plane, and second coupling means cooperating with the clamping jaws of the second and third pairs for preventing any relative axial movement between said second and third pairs of clamping jaws, while permitting relative transverse movements between said second and third pairs of clamping jaws.

9. The gripping assembly as claimed in claim 8, wherein each of the two clamping jaws of the third pair comprises, at each of its ends, a portion which projects laterally outwardly and which is in sliding contact with the end faces of the two clamping jaws of the second pair, said projecting portions forming said second coupling means.

10. The gripping assembly as claimed in claim 8 wherein each of the two clamping jaws of the third pair has, in its inner surface, a longitudinal groove having a semicircular cross section, which receives a part of the elongated object to be gripped.

* * * * *